United States Patent
Miller et al.

(10) Patent No.: US 9,935,844 B2
(45) Date of Patent: *Apr. 3, 2018

(54) REDUCING INTERNODAL COMMUNICATIONS IN A CLUSTERED SYSTEM

(71) Applicant: International Business Machines Corporation, Armonk, NY (US)

(72) Inventors: Robert Miller, Rochester, MN (US); Kiswanto Thayib, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 175 days.

This patent is subject to a terminal disclaimer.

(21) Appl. No.: 14/867,071

(22) Filed: Sep. 28, 2015

(65) Prior Publication Data

US 2017/0070448 A1 Mar. 9, 2017

Related U.S. Application Data (63) Continuation of application No. 14/848,401, filed on Sep. 9, 2015.

(51) Int. Cl.
*H04L 12/911* (2013.01)
*H04L 29/06* (2006.01)
*H04L 12/24* (2006.01)
*H04L 29/08* (2006.01)

(52) U.S. Cl.
CPC .............. *H04L 41/12* (2013.01); *H04L 47/78* (2013.01); *H04L 67/10* (2013.01)

(58) Field of Classification Search
CPC ............. G06F 11/1662; G06F 11/1092; G06F 3/0601–3/0605; G06F 9/5044–9/5061; G06F 11/2094; G06F 11/2046; G06F 11/2028; H04L 67/10–67/306

See application file for complete search history.

(56) References Cited

U.S. PATENT DOCUMENTS 6,996,631 B1 2/2006 Aiken, Jr. et al.
7,398,471 B1* 7/2008 Rambacher ........... H04L 67/306
  707/999.01

(Continued)

FOREIGN PATENT DOCUMENTS

EP 1768332 A2 3/2007
WO 0069140 A1 11/2000

OTHER PUBLICATIONS

Ni et al., "Hierarchical Content Routing in Large-Scale Multimedia Content Delivery Network," Authorized licensed use limited to: BME OMIKK. Downloaded on Mar. 18, 2010 at 07:27:37 EDT from IEEE Xplore, 0-7803-7802-4/03 © 2003 IEEE, pp. 854-859.

(Continued)

*Primary Examiner* — Wing F Chan
*Assistant Examiner* — Raji Krishnan
(74) *Attorney, Agent, or Firm* — Jay Wahlquist (57) ABSTRACT

A clustered system has a subset of nodes coupled to a particular cluster resource. Nodes not coupled to the cluster resource may operate on a cluster resource through a node coupled to that resource. The nodes coupled to the resource form a group, the nodes in the group perform protocols to operate on the cluster resource, nodes not in the group do not participate in the protocols.

7 Claims, 8 Drawing Sheets

(56) References Cited

U.S. PATENT DOCUMENTS

| | | | |
|---|---|---|---|
| 7,900,206 B1* | 3/2011 | Joshi | G06F 9/505 709/223 |
| 8,615,556 B1 | 12/2013 | Richards | |
| 8,707,083 B2* | 4/2014 | Nadolski | G06F 11/1484 709/223 |
| 2003/0023810 A1 | 1/2003 | Gordon et al. | |
| 2005/0021574 A1* | 1/2005 | Miller | G06F 11/1662 |
| 2005/0044226 A1 | 2/2005 | McDermott et al. | |
| 2008/0313330 A1* | 12/2008 | Miller | G06F 9/5061 709/225 |
| 2010/0064009 A1* | 3/2010 | Chen | G06F 9/5061 709/205 |
| 2013/0021970 A1 | 1/2013 | Lei | |
| 2013/0080559 A1 | 3/2013 | Rao et al. | |
| 2017/0070394 A1* | 3/2017 | Miller | H04L 47/78 |
| 2017/0070448 A1* | 3/2017 | Miller | H04L 47/78 |

OTHER PUBLICATIONS

Royer et al., "Multicast Operation of the Ad-hoc On-Demand Distance Vector Routing Protocol," Mobicom '99, Seattle, WA, ©ACM 1999, 1-58113-142-9/99/08, pp. 207-218.

Miller et al., "Reducing Internodal Communications in a Clustered System," U.S. Appl. No. 14/848,401, filed Sep. 9, 2015.

IBM, "List of IBM Patents or Patent Applications Treated as Related," signed Sep. 25, 2015, 2 pgs.

* cited by examiner

REDUCING INTERNODAL COMMUNICATIONS IN A CLUSTERED SYSTEM

BACKGROUND

The present disclosure relates to clustered computing systems, and more particularly, to clustered systems in which a subset of the nodes within the system couple to a resource shared by the nodes of the system. The disclosure further relates to methods of operating on or accessing the shared resource from the nodes particularly including the nodes not coupled to the resource.

SUMMARY

Embodiments of the invention include a system for performing operations on a cluster resource in a clustered system having a number of nodes. A cluster resource is coupled to at least one node and the node includes a cluster resource group (CRG) that associates the node and the cluster resource coupled to that node. A cluster resource communications group (CRCG) within the clustered system includes a subset of nodes less than the total number of nodes in the cluster, and in which the subset of nodes includes each node having a CRG that operates on that cluster resource. The nodes included in the CRCG are configured to perform a cluster resource protocol operative on the cluster resource. A node within the clustered system is configured to originate a cluster resource request, the node is configured to transfer the request to a node included in the CRCG having CRGs enabled to operate on the cluster resource. The nodes included in the CRCG are configured to perform a cluster resource protocol operative to perform the cluster resource request.

Other embodiments of the invention include a method for performing operations on a cluster resource within a clustered system having a number of nodes. The method comprises forming within a node coupled to a cluster resource a CRG enabled to operate on the cluster resource and forming a CRCG which includes a subset of nodes less than the total number of nodes in the cluster. The subset of nodes in the CRCG includes each node having a CRG enabled to operate on the cluster resource. The method includes communicating to the nodes information describing the CRG on a node coupled to the cluster resource and joining that node to a CRCG that includes the nodes coupled to the cluster resource. The method further includes the nodes in a CRCG that includes the nodes having a CRG enabled to operate on the cluster resource performing a cluster resource protocol to perform an operation on the cluster resource. The method also includes a cluster resource request originated by a node and directed to a cluster resource, and in which the cluster resource request includes an operation on the cluster resource. The node determines the identity of a second node included in a CRCG that includes nodes having a CRG enabled to operate on the cluster resource and transferring the request to the second node. The second node initiates a cluster resource protocol among the nodes in the CRCG, which operates to perform the operation included in the cluster resource request and the second node transfers the results of the request to the first node that originated the request.

Computer program products may embody the invention to perform the methods of the invention. The computer program products are executed on nodes within the cluster and directs nodes coupled to a cluster resource to form a CRG for the resource and to form a CRCG including those nodes. The computer program products direct the nodes within a CRCG to perform cluster resource protocols that operate on a cluster resource. The computer program products also direct a node to originate a request to operate on a cluster resource and to determine and transfer the request to a node included in CRCG including nodes having CRGs enabled to operate on the cluster resource. The computer program product directs the nodes in the CRCG to perform a cluster resource protocol operating to perform the request and to transfer the results of the request to the node that originated the request.

While the present disclosure is not necessarily limited to such applications, various aspects of the disclosure may be appreciated through a discussion of various examples using this context. The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

In a clustered system a cluster resource is a particular resource coupled to one or more nodes of the cluster and accessible to multiple nodes, including both the nodes coupled to that resource and nodes not coupled to it. Nodes not coupled to that resource utilize nodes that are coupled to that resource as agents to operate on or access the resource. Accordingly, the nodes within the cluster communicate amongst each other with regard to a particular cluster resource. A node coupled to a cluster resource communicates with other nodes to notify the nodes that the node is coupled to that resource and to communicate information describing the resource and its status. Nodes also communicate requests to access or operate on a cluster resource, from a node originating that request to a node coupled to the resource capable of performing the request, and to communicate the results of a request back to the node originating the request.

Communications between nodes commonly involve a protocol composed of a sequence of messages between nodes. Protocols generally are either peer to peer (PtP) protocols, in which an originating node broadcasts a request or status regarding a cluster resource to all other nodes, or leader-based, in which one node receives requests and, acting as a leader, directs processing of the request to a particular other node and directs the results of the request back to the originating node. It is known within the art that leader-based protocols have the disadvantage of more complex recovery from errors involving a request, a cluster resource, or a node coupled to a cluster resource, as the state of these may be known to only one or a subset of nodes, which may themselves have failed.

In contrast, PtP protocols commonly make every node aware of the state of any request or the state of a cluster resource and nodes coupled to it, and recovery from errors is comparatively much simpler. However, many PtP protocols have the disadvantage that they involve each node communicating with every other node and can generate numerous message communications, multiplied by the square of the number of nodes involved in the protocol, which in turn may be all nodes in the cluster. PtP protocols involving cluster resources shared by all nodes in a cluster particularly involve n-squared message exchanges, where n is the number of all nodes in the cluster, or at least all nodes sharing a particular cluster resource, even though commonly only two or three nodes may be actually coupled to that resource.

For clusters having few nodes, this is generally not problematic. However, contemporary clustered systems, taking advantage of scale-out and virtualization technologies, can readily include tens, hundreds, or thousands of nodes. For clustered systems that include this number of nodes, PtP protocols that have n-squared message exchanges become impractical if not outright inoperable.

Aspects of the invention relate to a clustered system having a cluster resource coupled to a subset of the nodes of the system and in which a larger set or all of the nodes, including nodes not coupled to the resource, operate on or access the resource. Embodiments of the invention may include a cluster resource communications group (CRCG) formed of the subset of nodes coupled to the same cluster resource. A node coupled to a particular cluster resource may form a cluster resource group (CRG) within the node associating the node with that cluster resource. A CRCG may include the CRGs of the nodes coupled to that cluster resource. In an aspect of the invention a node forming a CRG to operate on a cluster resource may communicate with other nodes of the cluster to inform the nodes of the existence and characteristics of the CRG.

The embodiments may include cluster resource protocols performed between the nodes included in a CRCG. The cluster resource protocol may use the CRGs included in the CRCG to operate on a cluster resource. In an aspect of the invention a node not coupled to a cluster resource may be aware of nodes having CRGs to operate on that cluster resource.

Embodiments may include a cluster resource request protocol by which a node not coupled to a cluster resource may communicate a cluster resource request to operate on that cluster resource to a node having a CRG to operate on that resource, and by which the node having the CRG may perform the request and may communicate the results of the request to the node not coupled to that resource. In other aspects of the invention nodes included in a CRCG may perform a cluster protocol to effect an operation in a cluster resource request.

It is another aspect of the invention that it is suited to embodiment within the nodes of a clustered system as a computer program product. In embodiments of the invention the computer program product may operate in a node to cause the node or the elements therein to take particular actions within the scope of the invention As will be shown through an understanding of the description following, the aspects and embodiments of the invention may include only nodes within a CRCG to operate on a cluster resource. As the number of nodes coupled to a particular cluster resource is normally very few—usually just two or three to provide redundant access paths or copies—irrespective of the total number of nodes in the cluster or the number of nodes sharing the resource, the embodiments of the invention substantially reduce the number of messages exchanged in cluster resource protocols, overcoming the disadvantages described previously in n-squared message exchanges, while particularly preserving the advantages of PtP protocols for simpler cluster error recovery.

Figure 1:
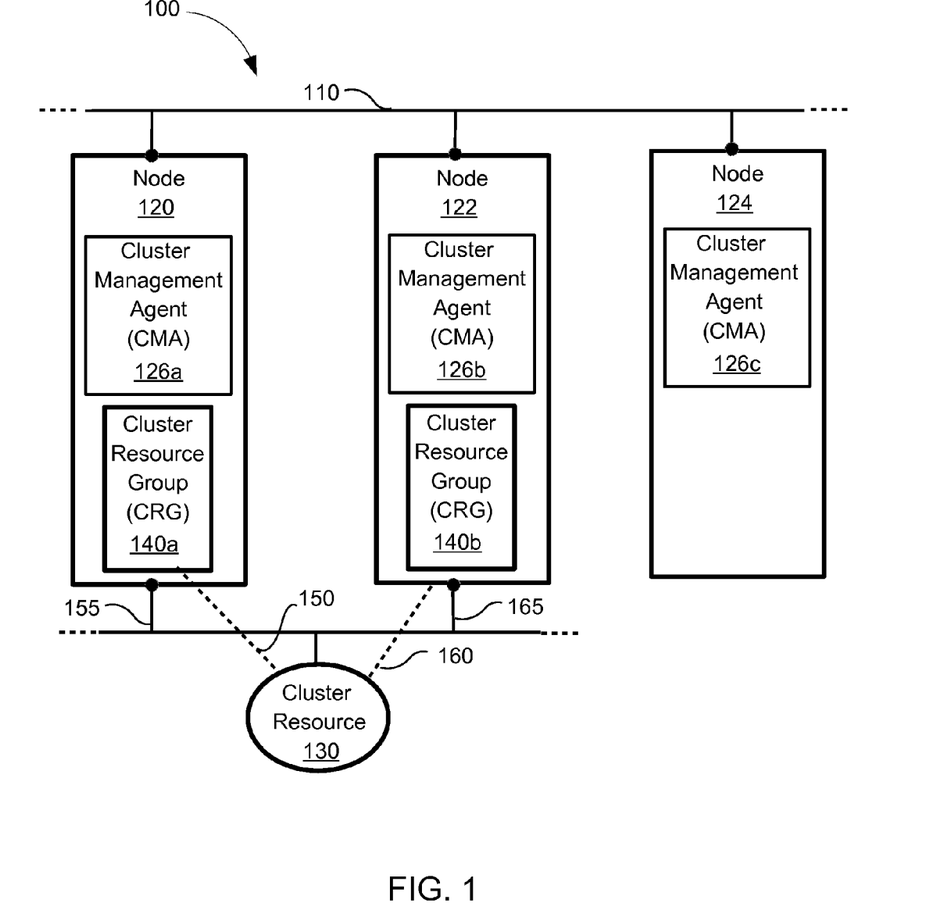
FIG. 1 is a diagram depicting a clustered system having cluster resources, cluster resource groups (CRGs), and cluster management agents (CMAs) within a clustered system.

FIG. 1 illustrates a plurality of nodes 120, 122, and 124 coupled together 110 to form a clustered system 100. A cluster resource 130 is coupled to nodes 120 and 122 but not coupled to node 124. For purposes of understanding the invention and within the scope of the disclosure nodes 120, 122, and 124 may be any of a computer, a server, a network attached device, a process or virtual machine within a computer or server, a network gateway or router, an agent acting for another clustered system otherwise distinct from the clustered system 100, or any combination or plurality of these or any other entity suitably operating as a node in coordination with other such nodal entities to form a clustered system.

Such embodiments do not represent an exhaustive enumeration of entities advantageously embodying the invention and it will be apparent to one skilled in the art to employ other entities suitable to clustering as nodes 120, 122, or 124.

A cluster resource 130 may be any type of resource suitable to be shared by multiple nodes, a resource accessible from only one node at any particular time but transferable between nodes with respect to accessing that resource, or a resource duplicated within one or a plurality of nodes. For purposes of further understanding the invention and within the scope of the disclosure a cluster resource 130 may be any of a storage device or volume group, data or a database, a network component, a virtual machine or a computing process or job, a computing application, or any other resource, or combination or plurality of these limited only in that they are coupled to a same particular node, capable of being operated on or accessed by a plurality of nodes within the clustered system 100, whether the nodes perform these functions on the resource concurrently, or individually and sequentially. Further a network component may include a network connection or port, a network adapter, a virtual network adapter, a network address, a communications network, or other such elements commonly recognized in the art as components utilized in forming a communications network.

Such embodiments do not represent an exhaustive enumeration of those types of entities advantageously employing the invention and it will be apparent to one skilled in the art to employ other resources suitable for use by a plurality of nodes as cluster resources 130.

A coupling between a node and a cluster resource enables the node to directly operate on a resource by means of the manner of coupling. A node, such as nodes 120 and 122, may be coupled to a cluster resource 130 by means of the node having one or more instances of the cluster resource 130 contained or as elements within the node or by means of some physical or logical connection from the node to one or more instances of the cluster resource 130. It will be appreciated by one of ordinary skill in the art that the manner of coupling a cluster resource to a node may take any of a variety of containment, physical or logical connections or associations, network connections or communications, or other such ways to couple two elements of a system as are commonly known in the art, and is not limited to any particular such form. It will be further apparent to one skilled in the art that the number of nodes comprising a clustered system 100 is not limited to those shown, and that the number of nodes coupled to a cluster resource 130 is not limited as shown.

In embodiments a coupling 155 or 165 between a node 120 or 122, respectively, and a cluster resource 130 may be active and fully operational for the node to operate on or access that cluster resource, or the coupling 155 or 165 may or may not be fully operational or may be in a form of standby or logically, but not physically, active state. A coupling may become active or inactive in response to operations of the node, operations of the node with respect to the cluster resource 130, the means of coupling becoming suspended or terminated, or the means of the coupling itself starting or resuming from a suspended or terminated state. In some embodiments all couplings between nodes and a particular cluster resource 130, such as 155 and 165, may be active simultaneously. In other embodiments a cluster resource 130 may have only one active coupling 155, with the other couplings 165 in an inactive state, and through cooperation of the nodes the active coupling may be transferred from one node 120 to another node 122 such that the active coupling 155 becomes inactive and inactive coupling 165 becomes active.

Operating on a cluster resource may include configuring a coupling to the resource; configuring the resource; configuring additional instances of a resource; configuring a node to enable it to operate on or access a resource, or to disable a node from operating on or accessing a resource; establishing or changing which node or nodes have management control over a resource; reading from or writing to or otherwise using the resource to accomplish some function on behalf of a node; or, other such actions or forms of accessing a resource as known in the art appropriate to advantageously utilize the resource by a plurality of nodes in a clustered system.

A node may include a particular agent or function within the node directed to manage or operate on a particular cluster resource. In FIG. 1 a node 120 or 122 coupled 155 and 165, respectively, to a cluster resource 130 may preferably utilize a cluster resource group (CRG), 140*a* or 140*b*, respectively, as an agent within the node operating on, 150 and 160, respectively, the particular cluster resource 130 to manage or operate on that resource. In embodiments a CRG may be a job, a task, a program, or a background process such as a daemon. It will be appreciated by one of ordinary skill in the art that the CRGs 140*a* or 140*b* are representative of one or a variety of alternative embodiments of the function within a node that manages or operates on a cluster resource coupled to that node, and that references herein to a CRG encompasses any particular such embodiment.

In one embodiment a CRG in a node may operate specifically on one particular cluster resource, or in other embodiments a CRG in a node may operate on a plurality of particular cluster resources, whether like or unlike resources, each coupled to that node. Accordingly, in an embodiment a CRG may have characteristics and capabilities adapted specific to the characteristics, capabilities, and the manner of coupling to any particular cluster resource 130. In another embodiment an instance of a CRG 140*a* in a node 120 and an instance of a CRG 140*b* in a node 122 may be largely identical and indistinguishable except for the locality within their respective nodes or the active or inactive state of their respective couplings 155 or 165 to the cluster resource 130.

Nodes within a cluster commonly also have an agent or function to perform communications with other nodes, such as protocols for managing the operation of nodes within the cluster or communicating status of the nodes. FIG. 1 illustrates that a node may include or contain a Cluster Management Agent (CMA) 126*a*, 126*b*, or 126*c* to perform communications protocols with other nodes, whether or not those other nodes also include a CMA. In embodiments a CMA may be a job, a task, a program, or a background process such as a daemon. It will be appreciated by one of ordinary skill in the art that the CMAs 126*a*, 126*b*, or 126*c* are representative of one or a variety of alternative embodiments of the function within a node that performs protocols to communicate with other nodes included in the cluster, and that reference to a CMA encompasses any particular such embodiment.

Figure 2:
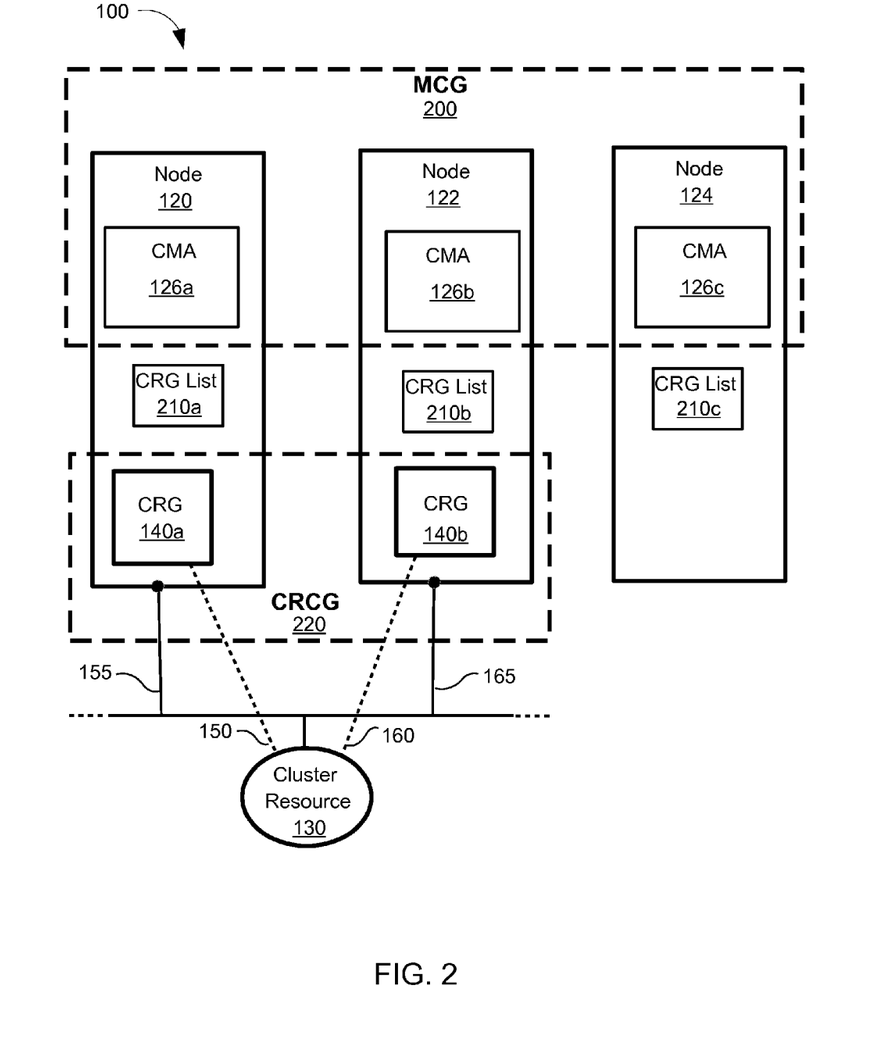
FIG. 2 is a diagram depicting a clustered system having a cluster resource communications group (CRCG) formed of a subset of the nodes in the cluster in which each node coupled to a particular cluster resource contains a CRG acting to access that cluster resource, and a management communications group (MCG) formed of all nodes within the clustered system.

FIG. 2 illustrates that a clustered system 100 may group nodes in regard to particular communications protocols that involve the nodes. The nodes in a clustered system 100 may expressly or implicitly form a Management Communication Group (MCG) 200 for purposes of participating in certain cluster protocols, such as adding, removing, or changing a node or cluster resource 130 within the cluster. In an embodiment a node in the clustered system 100 may include a CMA, and an MCG 200 may include the CMAs of the nodes.

FIG. 2 further illustrates that a clustered system 100 may include a Cluster Resource Communications Group (CRCG) 220 including nodes within the cluster coupled to a particular cluster resource 130. The nodes 120 and 122 within the CRCG 220 may communicate to perform certain protocols involving the cluster resource 130. The nodes 120 and 122 may have a CRG 140*a* or 140*b* operating on, 150 and 160, respectively, the cluster resource 130.

In an embodiment a CRCG 220 may include only nodes 120 and 122 coupled to a particular cluster resource 130, and exclude nodes 124 not coupled to that same resource. In other embodiments a node may be coupled to a plurality of cluster resources 130 and a node may belong to a plurality of CRCGs 220 in which each CRCG may include only nodes coupled to a particular one of the plurality of cluster resources, or a node may belong to a CRCG 220 which may include nodes coupled to all of the plurality of cluster resources. In another embodiment the nodes 120 and 122 may have a CRG 140a and 140b, respectively, enabled to operate on a particular cluster resource 130, the CRCG 220 may include the CRGs 140a and 140b, the CRGs 140a and 140b included in the CRCG 220 may communicate with the CRGs in the CRCG 220 to perform a cluster resource protocol, and the protocol may be a PtP protocol including messages between some or all nodes included in the CRCG 220.

A node may record or communicate information describing a cluster resource 130 to other nodes. The information may describe the node coupled to that resource, a CRG operating on that resource, a CRCG including that node or CRG, or the operational state or configuration of the cluster resource or the CRG. A node may include the information in a CRG list 210a, 210b, or 210c, and a CRG list may include nodes within the cluster that are coupled to a particular cluster resource. It will be apparent to one of ordinary skill in the art that in an embodiment a CRG list is not limited to a list structure per se and represents any form of data structure suitable to recording information included in a cluster resource descriptor. It will be further apparent to one of ordinary skill in the art that in an embodiment a CRCG may or may not be limited to only two nodes as shown in FIG. 2 CRCG 220, and that the nodes included in a CRCG, or the cluster resources 130, may vary according to the type of the resource and the composition of the clustered system 100.

Figure 3:
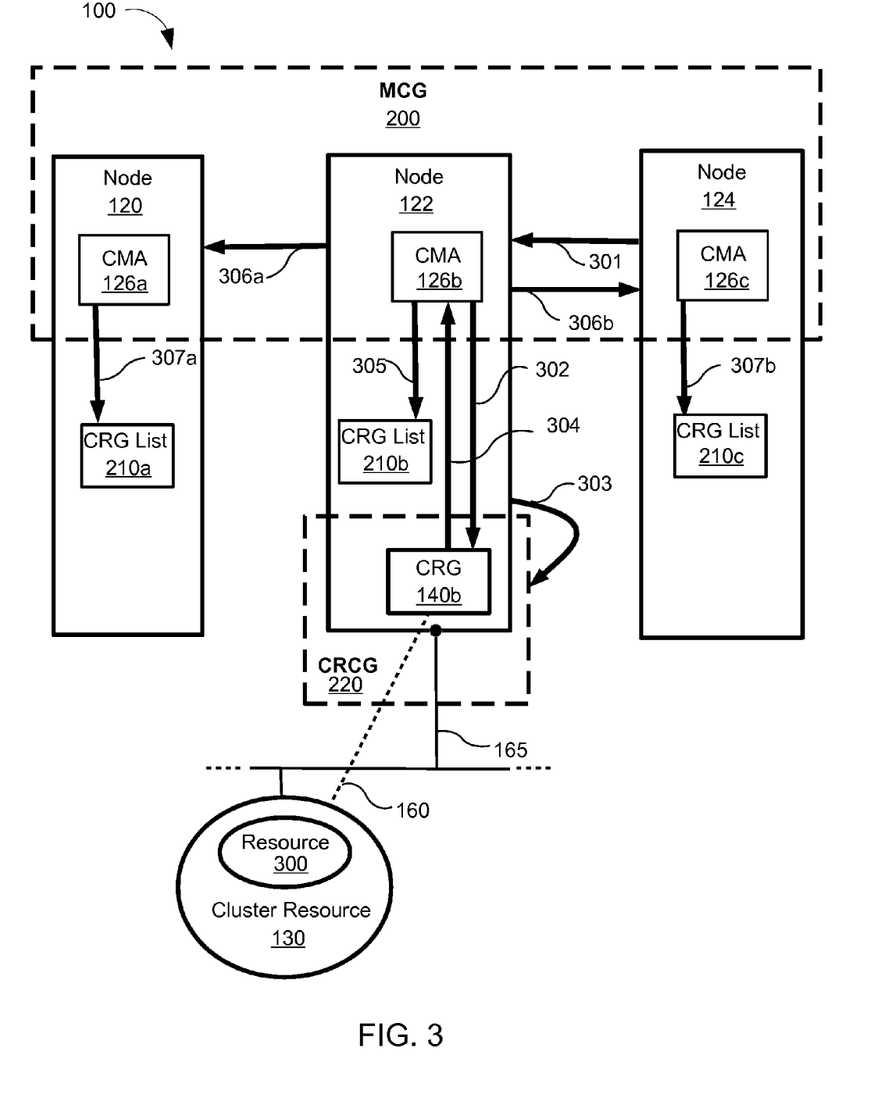
FIG. 3 illustrates making a resource into a cluster resource, forming a cluster resource group (CRG), and forming a CRCG.

FIG. 3 illustrates an exemplary process to make a resource coupled to a node into a cluster resource available to other nodes in the clustered system. A particular resource 300 of a node 122 may be suitable for use as a cluster resource 130, including but not necessarily limited to such exemplary resources as disclosed in the discussion of FIG. 1, and the resource 300 may or may not be coupled to other nodes of the cluster, and may or may not be initially accessible from node 122 as a cluster resource 130 to other nodes of the cluster. Accordingly, an action occurring within node 122, or directed from another to node 122, may cause the node in 302 to make resource 300 into a cluster resource 130. In embodiments the node may form a CRG 140b operating on 160 the cluster resource 130, and the node 122 may or may not initially contain a CRG 140b and may form CRG 140b in response to making the resource 300 into a cluster resource 130. In particular embodiments the node 122 may include a CMA 126b and the CMA 126b may act 302 to form the CRG 140b. In some embodiments the CRG 140b may operate solely on a particular cluster resource 130 while in other embodiments the CRG 140b may be enabled to operate on more than one particular resource 130.

In various embodiments of the invention a node 122 in 302 may make a resource 300 into a cluster resource 130 in response to a user interface or program operating within the node 122, may be in response to an event or other action occurring within the node 122, or may be in response to an event, action, or operation of the resource 300 coupled to the node 122. Additionally, in embodiments the node may make the resource 300 into a cluster resource 130 in response to a request originated on another node in the clustered system such as node 124 and the request may result from an event or action occurring on node 124, and communicated in 301 from the node 124 to the node 122. In some embodiments nodes 122 and 124 may include CMAs 126b and 126c, respectively, and in 301 CMA 126c may communicate the request to CMA 126b. It will be apparent to one of ordinary skill in the art that the actions that initiate making a resource coupled to a node into a cluster resource accessible by other nodes of the cluster are not limited to those described and may encompass any of a variety of actions within a resource, a node, or a clustered system intended to effect making a resource coupled to a particular node a cluster resource.

In an embodiment a node 122 may determine in 302 that no CRCG exists associated with a particular cluster resource 130. Accordingly, node 122 may in 303 create a CRCG 220 including node 122 as the initial member of the CRCG. In an embodiment the node 122 may include a CRG 140b and the CRG 140b may create the CRCG 220, the CRG 140b in 304 may communicate information describing the cluster resource to a CMA 126b within the node 122, and in 305 CMA 126b may record the information in a CRG list 210b. In various embodiments node 122 in 306a and 306b may communicate information describing the cluster resource 130 to other nodes 120 and 124 in the clustered system 100, and nodes 120 and 124 may record the information in CRG lists 210a and 210c, respectively. In some embodiments nodes may include CMAs and in 306a and 306b a CMA 126b may communicate information describing the cluster resource 130 to CMAs 126a and 126c of nodes 120 and 124, respectively. In 307a and 307b the CMAs 126a and 126c may record the information in CRG lists 210a and 210c, respectively.

Figure 4:
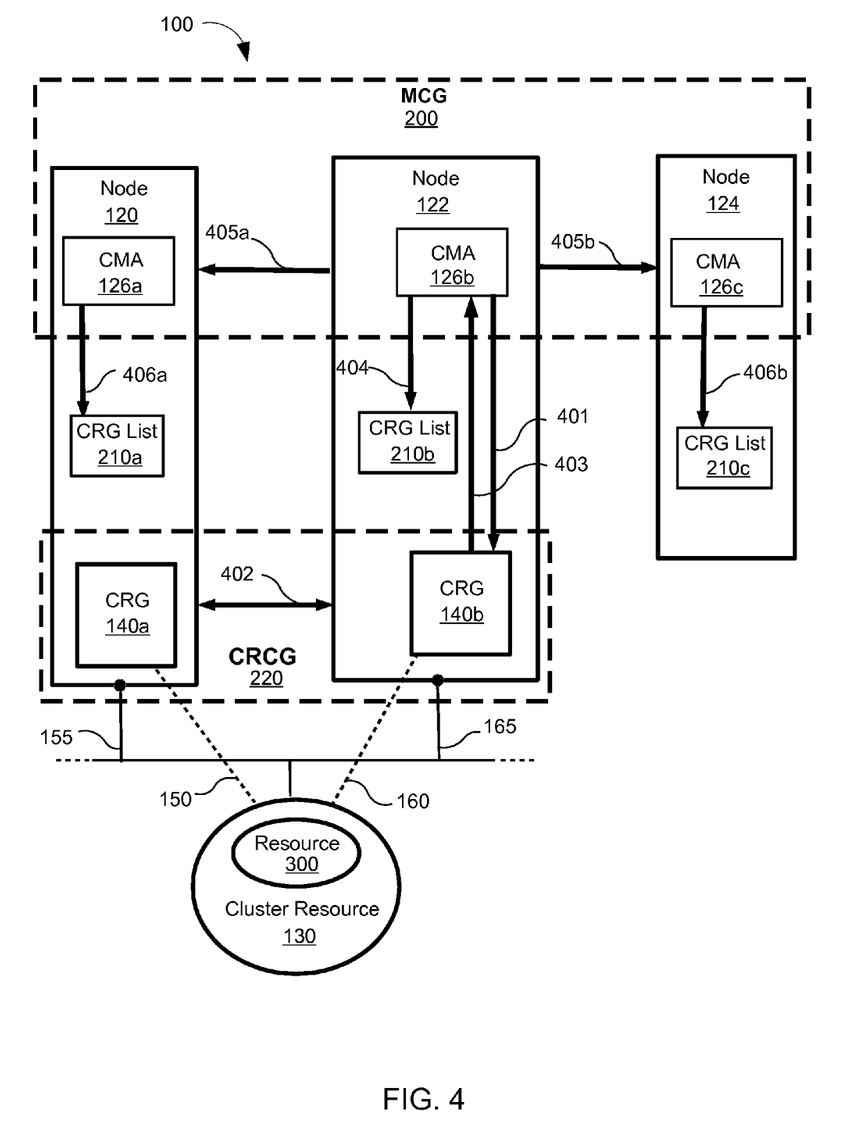
FIG. 4 illustrates a node joining a CRCG in response to making a resource into a cluster resource.

FIG. 4 illustrates an exemplary process for forming a CRG on a node coupled to a particular cluster resource and adding the node to a CRCG that includes other nodes coupled to that same cluster resource. A node 120 coupled 155 to a resource 300 may make the resource a cluster resource 130 and may then belong to a CRCG 220 formed to include nodes coupled to that same cluster resource 130. A node 122 may have or form a coupling 165 to the same resource 300; the coupling 165 may be but is not limited to any of the forms disclosed in the description of FIG. 1. An action occurring within the node 122, or directed to node 122 from another node 120 or 124, may cause node 122 to make the resource 300 a cluster resource 130 accessible from node 122. In embodiments the action may include but is not necessarily limited to any of the actions disclosed in the description of FIG. 3.

In embodiments a node 122 may in 402 communicate by means of a join protocol with other nodes 120 to include node 122 in a CRCG 220 that includes nodes coupled to the same resource 300 as cluster resource 130, and the protocol may be a PtP protocol involving all of the nodes included in the CRCG 220. In some embodiments node 122 in 401 may create a CRG 140b operating on 160 the cluster resource 130, and node 120 may have a CRG 140a operating on 150 the cluster resource 130. In embodiments a node 122 may include a CMA 126b and the CMA 126b may in 401 create the CRG 140b, in 403 the CRG 140b may communicate information describing the cluster resource 130 to the CMA 126b, and the CMA 126b in 404 may record the information in a CRG list 210b. In the embodiments the CRGs 140a and 140b may in 402 perform the join protocol. It will be evident to one of ordinary skill in the art that the join protocol may involve a sequence of messages exchanged between all or a subset of the nodes included in the CRCG, according to the type and manner of managing and sharing the resource 300 as a cluster resource 130, and that any of a variety of message passing means known in the art may be suitable for the nodes 120 and 122 to perform the protocol.

In embodiments a node 122 may in 405a and 405b communicate information describing the cluster resource 130 to other nodes, and the nodes may in 406a and 406b record the information in CRG lists 210a and 210c, respectively. In some embodiments a CMA 126b in node 122 may in 405a and 405b communicate the information to CMAs 126a and 126c within the nodes 120 and 124, and the CMAs 126a and 126c in 406a and 406b may record the information in the CRG lists 210a and 210c, respectively.

It will be evident to one of ordinary skill in the art that the manner of operation of the embodiments just described may extend to other operations of the nodes included in a CRCG or cluster resources coupled to those nodes. Such other operations may include but are not limited to communicating to nodes within the clustered system, a change in the state or configuration of a cluster resource or a CRG, including removing a cluster resource or CRG from a node or CRCG.

Figure 5:
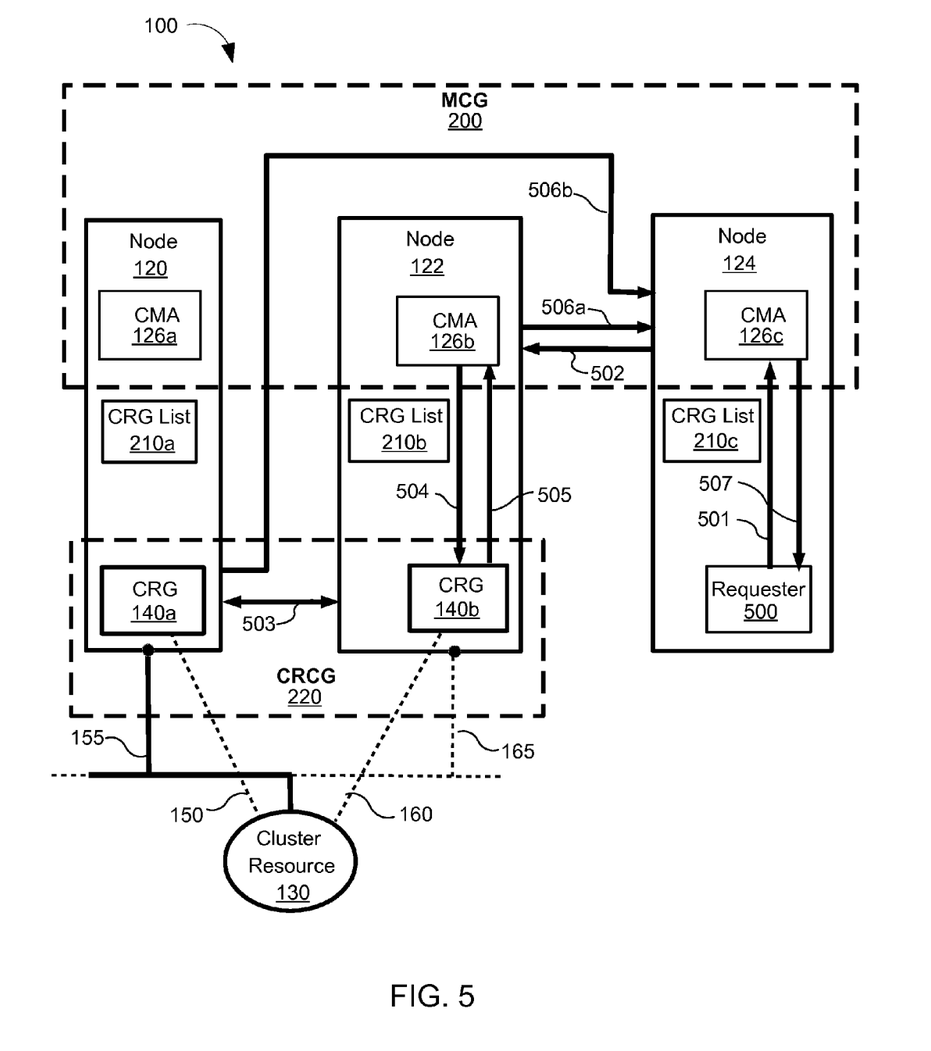
FIG. 5 illustrates performing a request to operate on a particular cluster resource in which the request originates on a node not in the CRCG including nodes coupled to that particular resource.

FIG. 5 illustrates a node not coupled to a particular cluster resource requesting to perform an operation on that resource. Nodes 120 and 122 are shown coupled to a cluster resource 130, while node 124 is shown not coupled to the cluster resource 130. In embodiments a requester 500 in node 124 may in 501 create a request to perform an operation on the cluster resource 130. In the embodiments a requester may be a process or task, a program, a job, a user interface, a daemon, or any other entity contained within or interacting with a node and commonly known in the art to be capable of creating or generating a request to operate on or access a cluster resource. In some embodiments a node 124 may have a CMA 126c, in 501 the CMA 126c may receive the request from the requester 500, and the CMA 126c may record information describing the request and the requester 500 for purposes of later communicating the results of the request to the requester 500.

In an embodiment node 124 may in 501 determine that it does not have a coupling to the cluster resource 130 and may then determine a target node 122 coupled 165 to that resource. In the embodiments node 124 may select a target node 122 based on various policies, such as locality of the target node in the clustered system relative to that of node 124, the identity of various alternative target nodes, or by any criteria or protocol commonly known in the art suitable for selecting an agent capable of servicing a request form among a plurality of such agents. Node 124 may in 502 then communicate the request to the selected target node 122. In some embodiments node 124 may include a CRG list 210c to determine that it is or is not coupled to a particular cluster resource 130 or to determine a possible target node 120 or 122 coupled to the cluster resource 130.

In the embodiments a target node 122 in 502 may receive the request from node 124, and the node 122 may record information describing node 124 and the request for purposes of communicating the results of the request to the node 124. The target node 122 may then in 503 perform a request protocol with the nodes included in the CRCG 220 to determine a node in the CRCG 220—as shown node 120 or 122—to perform the request. In an embodiment the request protocol may be a PtP protocol performed between each and every other node within the CRCG 220. In some embodiments the nodes 120 and 122 may have a CRG 140a and 140b operating on, 150 and 160 respectively, the cluster resource 130, and the CRGs 140a and 140b may perform the request protocol.

In 503 node 122 may communicate the request to other nodes 120 in the CRCG 220 to initiate the request protocol. The nodes 120 and 122 in the CRCG may determine in 503 if they are able to perform the request and in 503 communicate to the other nodes in the CRCG the results of that determination. A node 122 may determine that it is inactively coupled 165 to the cluster resource 130 and cannot perform the request, while a node 120 may determine that it is actively coupled 155 to the cluster resource and can perform the request. Accordingly the node 120 in 503 may operate on the cluster resource 130 to complete the request. Also in 503 node 120 may communicate the results of the request to node 122, and in 506a node 122 may communicate the results of the request to node 124. In an alternative embodiment node 120 may in 506b communicate the results of the request to node 124. In some embodiments the nodes 120 and 122 may have a CRG 140a and 140b operating on, 150 and 160 respectively, the cluster resource 130, and the CRGs 140a and 140b may in 503 perform the request protocol.

In other embodiments node 122 may have a CMA 126b and in 502 CMA 126b may receive the request from node 124. Node 122 may also have a CRG 140b, in 504 the CMA 126b may transfer the request to the CRG 140b, in 505 the CRG 140b may transfer the results of the request to the CMA 126b, and in 506a the CMA 126b may transfer the results of the request to node 124. Similarly, in an alternative embodiment, node 120 may have a CMA 126a and in 506b the CMA 126a may transfer the results of the request to node 124.

A node 120 or 122 in the CRCG 220 may contain a requester and a node 120 may determine that it has an active coupling 155 to the cluster resource 130 and may operate on the cluster resource 130 using that coupling. Alternatively, a node 122 in the CRCG 220 may contain a requester and may determine that it has an inactive coupling 165 to a cluster resource 130 and, accordingly, may communicate the request to a target node 120, or may initiate a request protocol among the nodes 120 and 122 included the CRCG 220.

Figure 6:
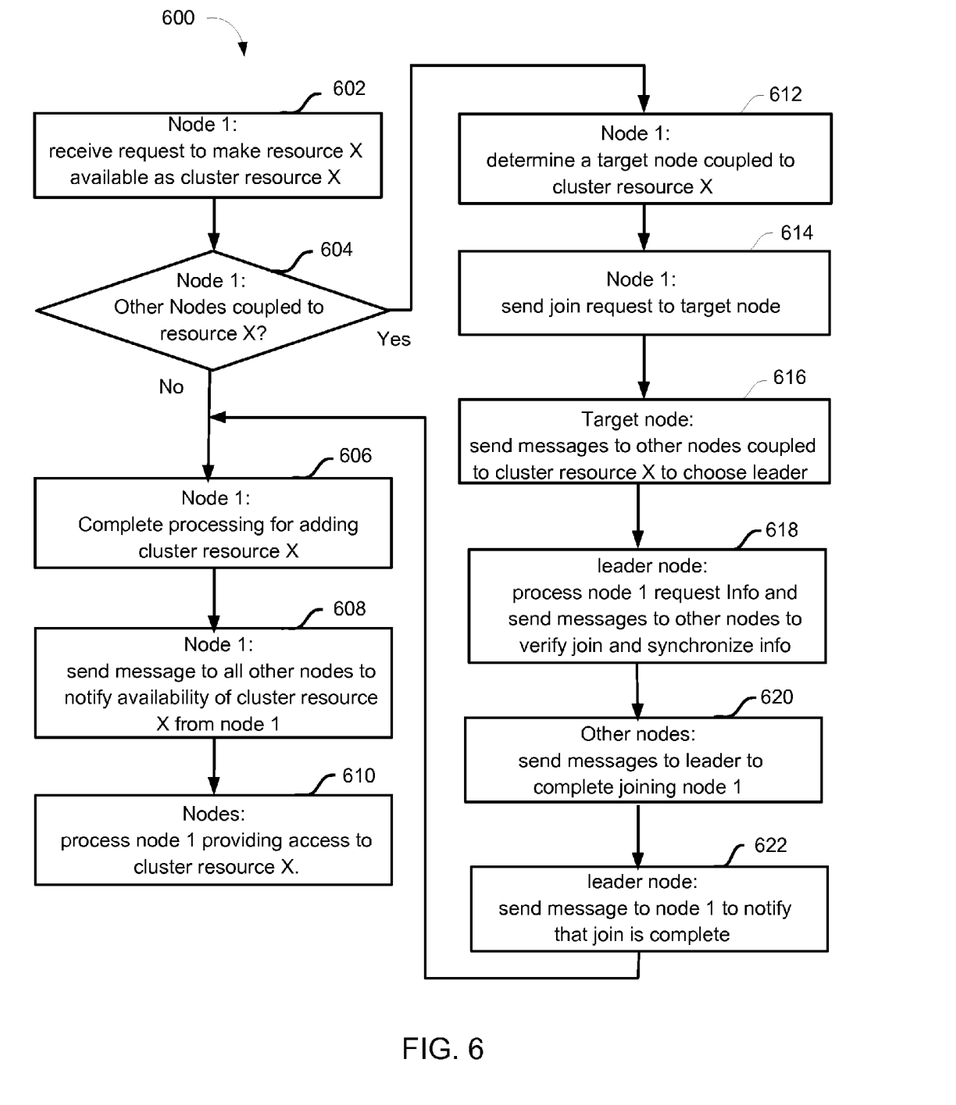
FIG. 6 is a flowchart illustrating a node having a cluster resource joining the CRCG including other nodes having the same cluster resource.

FIG. 6 is a flow diagram illustrating an exemplary process 600 to make a cluster resource X available from a node, and will be understood within the context of the disclosure of the preceding FIG. 1 through FIG. 5, and particularly in the context of a subset of the nodes of the cluster being coupled and providing access to a particular cluster resource X and included in a CRCG. The flow illustrated by FIG. 6 is suitable for implementation as a computer program product operating in the nodes.

In 602 a node 1 may originate a request to make a resource coupled to node 1 into a cluster resource X available to other nodes from node 1. Alternatively, at 602 a node 1 may receive a request from another node to make a resource coupled to node 1 into a cluster resource X available from node 1. At 604 node 1 may determine whether other nodes also have a coupling to the cluster resource X. If node 1 determines in 604 that no other nodes are coupled to resource X, at 606 node 1 may complete processing within node 1 to make resource X into a cluster resource X. At 608 node 1 may communicate with other nodes in the cluster to notify the nodes that cluster resource X is coupled to and accessible from node 1, and at 610 those nodes may process the notification.

In embodiments the request at 602 may be generated by a job, a task, a process, or a daemon of other analogous functions operating in node 1 or another node, the request may be generated by an action or event occurring or directed at node 1, or the request may be generated by an action or event occurring or directed at another node and communicated from that node to node 1. In embodiments node 1 may have a CMA and a node 1 CMA may perform operations included in steps 602 and 604, and in 606 through 610 the node 1 CMA may communicate with other nodes or CMAs of other nodes. In embodiments node 1 or a node 1 CMA may create a CRG X to operate on cluster resource X, and at 604 the node 1 CRG X may determine if other nodes are coupled to the resource and the node 1 CRG X may perform operations included in steps 606 through 610.

In a cluster where a plurality of nodes may couple to the same, particular cluster resource the nodes having that coupling may need to synchronize operations on and access to that resource. At 604, in embodiments a node 1 may determine that other nodes are coupled to cluster resource X. Accordingly, at 612 node 1 may determine the identity of a target node coupled to cluster resource X and in 614 node 1 may send a request to the target node to join node 1 to the subset of nodes coupled to cluster resource X. Joining node 1 to the subset may require the nodes in the subset to determine that node 1 is compatibly suited to joining the nodes in the subset. Joining node 1 to the subset also may require the nodes in the subset to synchronize various aspects of operating on cluster resource X with respect to node 1 also operating on cluster resource X or joining the subset.

In embodiments at steps 616 through 622 the subset of nodes coupled to cluster resource X process node 1 joining the subset. At 616 a target node may initiate a leader protocol with the nodes in the subset communicating to choose a leader node to coordinate joining node 1 to the subset. Alternatively, at 616 a target node may assume the role of leader node, and may or may not communicate to the other nodes in the subset that the target node is acting as a leader node. The leader protocol may be a PtP protocol, the protocol may include messages, or a sequence of messages, between nodes coupled to the cluster resource X, and the messages may be exchanged between each and every node coupled to the cluster resource X.

At 618 a leader node may process information in the request and regarding node 1 and may communicate with other nodes in the subset to cause the nodes to verify that node 1 is compatibly suited to join the subset, and to cause the nodes to synchronize information regarding operations on cluster resource X to prepare for node 1 operating on cluster resource X. At 620 the nodes may communicate to the leader node that node 1 is compatible to join the subset and the nodes are synchronized with respect to information regarding node 1 and operating on and accessing cluster resource X, such that upon completing joining the subset, node 1 may proceed to operate on and access cluster resource X. At 622 the leader node may communicate with node 1 to notify node 1 that joining node 1 to the subset is complete. Node 1 may at 606 complete processing of adding cluster resource X to node 1.

In embodiments, a node may have a CRG list recording nodes coupled to cluster resource X and at 612 the node 1 may use a CRG List to determine a target node, and at 616 through 620 a node may use a CRG list to determine nodes coupled to cluster resource X. In some embodiments a node may have a CMA and at 612 through 622, as well as 612 and 606 through 610 a CMA in a node may act for the node to perform the operations included in those steps.

In embodiments a node coupled to a cluster resource X may have a CRG X to operate on the cluster resource X, and nodes coupled to the cluster resource X may be included in a CRCG X. At 616 through 622, and 606 through 610, a CRG X in a node may act for the node to perform operations included in those steps, a CRG X in a node may select other nodes at 616 through 622 based on the inclusion of those nodes in a CRCG X including nodes coupled to the cluster resource X.

Figure 7:
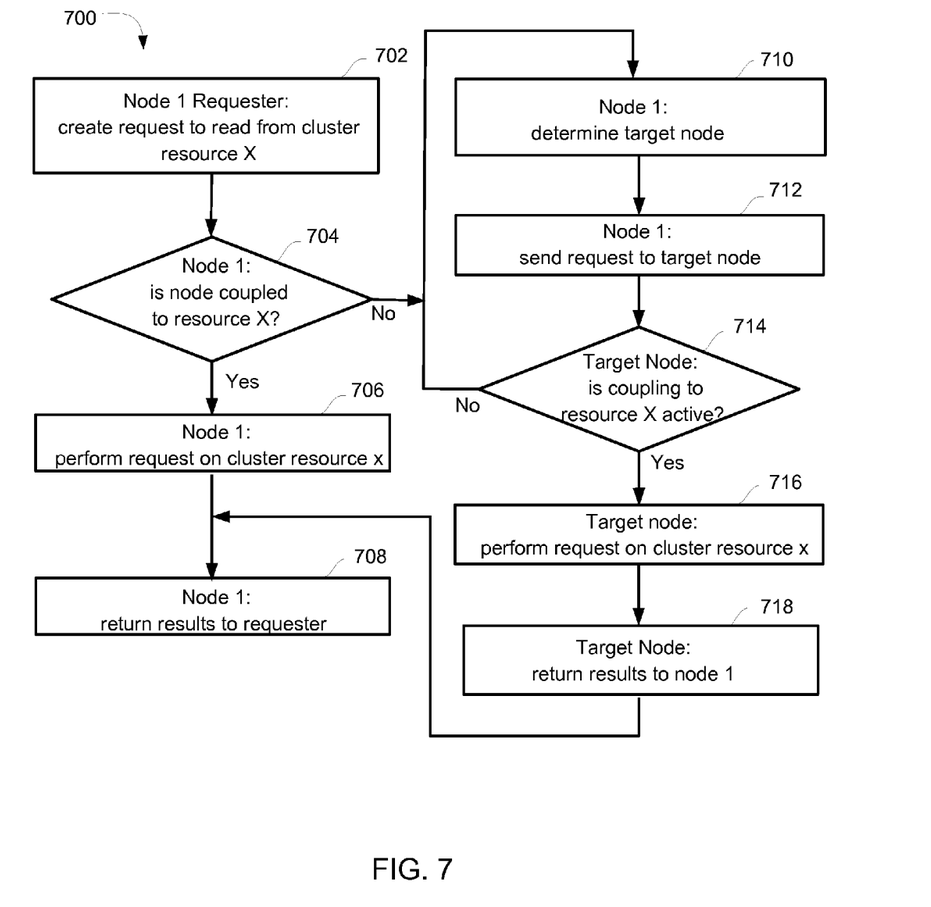
FIG. 7 is a flowchart illustrating the operation of the nodes processing a request to operate on a cluster resource.

FIG. 7 is a flow diagram illustrating an exemplary process 700 for a node to request an operation to be performed on a cluster resource. FIG. 7 will be understood within the context of the disclosure of the preceding drawings FIG. 1 through FIG. 5, and particularly in the context of a subset of the nodes of the cluster being coupled and providing access to a particular cluster resource X. The flow illustrated by FIG. 7 is suitable for implementation as a computer program product operating in the nodes.

In an embodiment at 702 a requester within a node 1 may generate a request to operate on or access cluster resource X. The requester may be a process or task, a program, a job, a user interface, a daemon, or any other entity contained within or interacting with a node and commonly known in the art to be capable of creating or generating a request to operate on or access a cluster resource, and the requester may request the operation in response to an action or event occurring in or directed from another node to node 1, such as a user interface, programming interface, or change in state or configuration of an element of a node or a cluster resource X. At 704 node 1 may determine whether it is coupled to the cluster resource X and if node 1 determines that it is coupled to cluster resource X, at 706 node 1 may perform the request, operating on the cluster resource X. At 708 node 1 may transfer the results of the request to the requester.

At 704 a node 1 may determine that it is not coupled to the cluster resource X, or that the coupling is inactive and may proceed to 710. At 710 node 1 may determine a target node having access to the cluster resource X and at 712 node 1 may send the request to the target node. At 714 the target node may determine that the coupling to the cluster resource X is active and then may proceed to 716, where at 716 the target node may perform the requested operation on the cluster resource X. In some embodiments at 716 the target node may perform a request protocol with other nodes coupled to the cluster resource X to determine a node to operate on the cluster resource X to complete the requested operation. The protocol may be a PtP protocol, the protocol may include messages, or a sequence of messages, between nodes coupled to the cluster resource X, and the messages may be exchanged between each and every node coupled to the cluster resource X. At 718 the target node may return the results of the request to node 1 and at 708 node 1 may return the results to the requester.

At 714 a target node may determine that the coupling to the cluster resource X is inactive and may proceed to 710. At 710 the target node may determine an alternative target node and, accordingly, at 712 the target node may send the request to the alternative target node and the alternative target node, now acting as the target node, may performs the steps 714 through 718, as previously described, including that the alternative target node at 714 may determine that the coupling from it to the cluster resource X is inactive and may determine yet another alternative target node. Steps 714 leading to steps 710 and 712 may be repeated until a suitable alternative target node may be determined that may proceed at 716 to perform the request.

In some embodiments a node may have a CMA, and a node 1 CMA may perform operations included in steps 702 through 712. A target node CMA may perform operations included in steps 714 through 718, and may perform operations included in the iteration of steps 710 through 714 as an alternative target node. Embodiments may include a node having a CRG X to operate on the cluster resource X, and a node 1 CRG X may perform operations included in steps 702 through 712. A target node CRG X may perform operations included in steps 714 through 718, and may perform operations included the iteration of steps 710 through 714 as an alternative target node. Embodiments may also include a CRG List, and node 1, a node 1 CMA, or a node 1 CRG X may use a CRG List to perform operations in steps 704, 710, or to perform a request protocol with nodes coupled to cluster resource X at 716.

Figure 8:
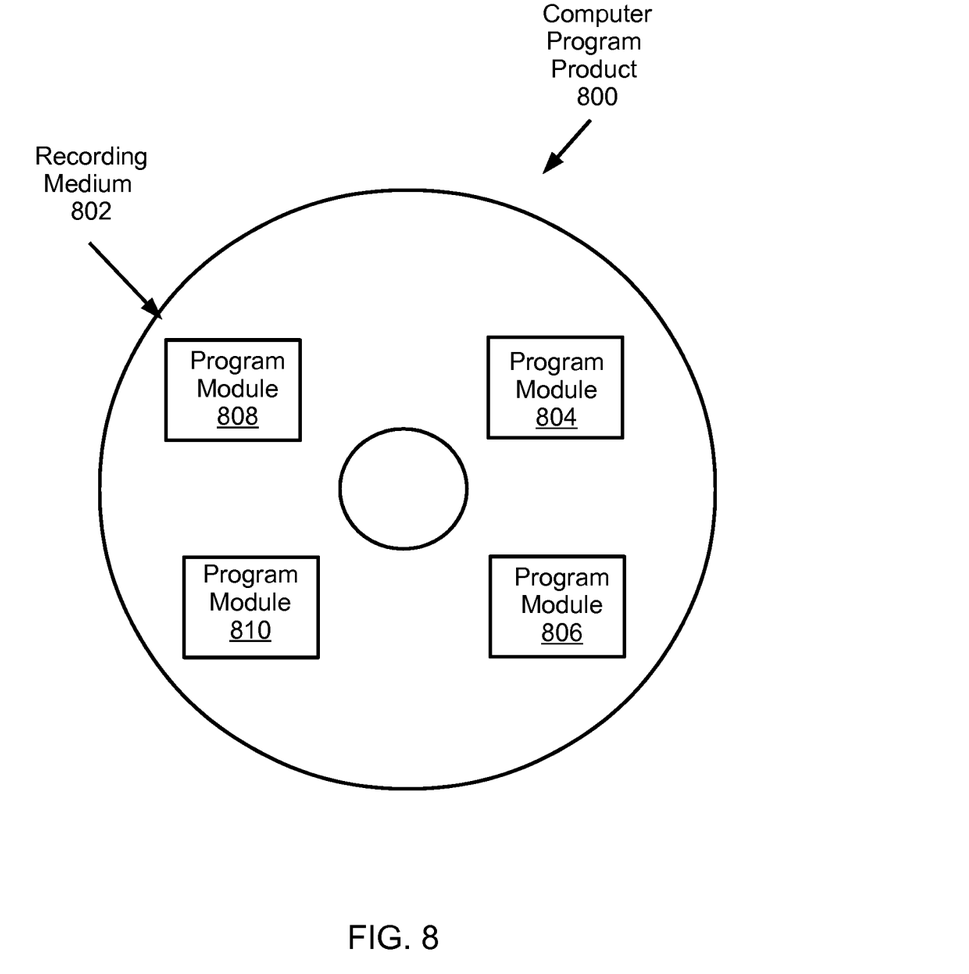
FIG. 8 is a block diagram illustrating a computer program product according to the features of the invention.

FIG. 8 depicts an article of manufacture or computer program product 800 that is an embodiment of the invention. The computer program product 800 includes a recording medium 802 that stores programs modules 804, 806, 808, and 810 for the nodes to carry out the aspects of the invention. The recording medium 802 may be a CD ROM, DVD, tape, diskette, non-volatile or flash memory, storage medium accessed by a network connection, or other similar computer readable medium for containing a program product.

A sequence of program instructions within or an assembly of one or more interrelated modules defined by the program modules 804, 806, 808, or 810 direct nodes within a clustered system to implement the aspects of the invention, including but not limited to the structures and operations illustrated in FIG. 1 through FIG. 7 and described in the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for performing operations on a cluster resource within a clustered system having a plurality of nodes, the method comprising:

making a resource coupled to a first node into the cluster resource;

forming in the first node a first CRG, the first CRG operating on the cluster resource;

forming a cluster resource communications group (CRCG), the CRCG including a subset of the plurality of nodes, the subset including less than all of the plurality of nodes, the subset including the first node;

communicating to at least one other node included in the plurality of nodes CRG information, the CRG information descriptive of the first CRG and the CRG information including cluster resource information, the cluster resource information descriptive of the cluster resource;

performing a cluster resource protocol, the protocol performing an operation on the cluster resource, the protocol performed by nodes within the subset of nodes included in the CRCG; and performing a cluster resource request, the cluster resource request originating on a second node that is not coupled to the cluster resource and is excluded from the CRCG, the cluster resource request including the operation, the second node transferring the request to the first node, the first node initiating the protocol;

wherein initiating the protocol comprises, in response to receiving the cluster resource request from the second node:

recording, by the first node, information identifying the second node and the cluster resource request;

performing a request protocol, by the first node, only with each node included in the CRCG to determine a node included in the CRCG to perform the cluster resource request;

performing the cluster resource request by the determined node;

communicating results of performing the cluster resource request from the determined node to the first node; and communicating the results of performing the cluster resource request from the first node to the second node using the recorded information.

2. The method of claim 1 wherein the first node is a computer, a server, a virtual machine, a network component, or a second clustered system coupled to and distinct from the first clustered system.

3. The method of claim 1 wherein the resource is a processing or co-processing element, a memory element, a storage medium, a storage volume or pool, an IO device, a database, a data set, a network component, a network connection, a network identifier, a virtual machine, or an application, a program, or a job executed in the first node.

4. The method of claim 1 wherein the operation is effective to start, stop, access, or alter an operational state or configuration of the cluster resource; to start, stop, or alter a configuration of the first CRG; to add the first CRG to the CRCG; to transfer control of the cluster resource from the first CRG to a second CRG, the second CRG included in a third node, the third node included in the CRCG; or to alter access to the cluster resource by the at least one other node.

5. The method of claim 1 further comprising:

forming the first CRG in response to making the resource into a cluster resource and in response to the first CRG not yet existing on the first node; and forming the CRCG in response to forming or starting the first CRG and in response to the CRCG not yet existing in the first clustered system.

6. The method of claim 1 further comprising:

forming a second CRG, the second CRG included in a third node;

including the third node in the CRCG; and performing the protocol between the second CRG and the first CRG.

7. The method of claim 6 wherein the performing the protocol between the second CRG and the first CRG comprises:

the first CRG determining that the third node is included in the CRCG;

the first CRG communicating the operation to the second CRG;

the second CRG determining that it can perform the operation;

the second CRG performing the operation; and the second CRG communicating the results of the operation to the first CRG.

* * * * *